(12) United States Patent
Uesaka et al.

(10) Patent No.: US 9,779,670 B2
(45) Date of Patent: Oct. 3, 2017

(54) DRIVING DEVICE OF DISPLAY MEDIUM, NON-TRANSITORY COMPUTER READABLE MEDIUM STORING DRIVING PROGRAM OF DISPLAY MEDIUM, AND DISPLAY

(71) Applicant: E Ink Corporation, Billerica, MA (US)

(72) Inventors: Tomozumi Uesaka, Kanagawa (JP);
Yasufumi Suwabe, Kanagawa (JP);
Yoshinori Machida, Kanagawa (JP);
Masaaki Abe, Kanagawa (JP)

(73) Assignee: E Ink Corporation, Billerica, MA (US)

( * ) Notice: Subject to any disclaimer, the term of this patent is extended or adjusted under 35 U.S.C. 154(b) by 370 days.

(21) Appl. No.: 14/096,357

(22) Filed: Dec. 4, 2013

(65) Prior Publication Data

US 2014/0333646 A1 Nov. 13, 2014

(30) Foreign Application Priority Data

May 9, 2013 (JP) ................. 2013-099347

(51) Int. Cl.
*G09G 5/02* (2006.01)
*G09G 3/34* (2006.01)
(Continued)

(52) U.S. Cl.
CPC ............. *G09G 3/344* (2013.01); *G02F 1/167* (2013.01); *G02F 2001/1678* (2013.01);
(Continued)

(58) Field of Classification Search
CPC ............. G02F 1/167; G02F 2001/1678; G02F 2203/34; G09G 3/2003; G09G 3/344
See application file for complete search history.

(56) References Cited

U.S. PATENT DOCUMENTS

| | | | | |
|---|---|---|---|---|
| 6,636,186 B1 * | 10/2003 | Yamaguchi | ............ | G09G 3/344 345/107 |
| 2005/0104844 A1 * | 5/2005 | Nakai | ............ | G09G 3/3446 345/107 |

(Continued)

FOREIGN PATENT DOCUMENTS

| | | |
|---|---|---|
| JP | 2012-133310 A | 7/2001 |
| JP | A-2007-249188 | 9/2007 |

(Continued)

OTHER PUBLICATIONS

Mar. 15, 2016 Office Action issued in Japanese Patent Application No. 2013-099347.

*Primary Examiner* — Abderrahim Merouan
(74) *Attorney, Agent, or Firm* — Brian D. Bean

(57) ABSTRACT

Provided is a driving device of a display medium, including an application unit that applies a voltage with a pulse width corresponding to a density of a color to be displayed to each of plural pixels of a display medium in which plural kinds of particle groups having different movement starting voltages for movement between a pair of substrates according to an electric field and different colors are enclosed, and a controller that controls the application unit so that a first voltage with a pulse width corresponding to a density of a color of a first particle group finishes being applied to each of the plural pixels, and then a second voltage with a pulse width corresponding to a density of a color of a second particle group is applied thereto.

7 Claims, 11 Drawing Sheets

(51) Int. Cl.
   *G09G 3/20* (2006.01)
   *G02F 1/167* (2006.01)
(52) U.S. Cl.
   CPC ....... *G02F 2203/34* (2013.01); *G09G 3/2003* (2013.01); *G09G 2300/0452* (2013.01); *G09G 2300/08* (2013.01)

(56) References Cited

U.S. PATENT DOCUMENTS

| | | |
|---|---|---|
| 2007/0188509 A1 | 8/2007 | Shigehiro et al. |
| 2008/0024482 A1* | 1/2008 | Gates .................. H04N 1/46 345/214 |
| 2008/0036731 A1* | 2/2008 | Shigehiro ............... G02F 1/167 345/107 |
| 2011/0187684 A1* | 8/2011 | Amundson ............. G09G 5/00 345/204 |
| 2011/0216101 A1* | 9/2011 | Yamada .................. G09G 5/10 345/690 |
| 2011/0316842 A1 | 12/2011 | Yamada et al. |
| 2012/0139966 A1* | 6/2012 | Mizutani ................ G09G 3/344 345/690 |
| 2012/0200610 A1 | 8/2012 | Sakamoto et al. |
| 2012/0256893 A1* | 10/2012 | Sakamoto ............ G09G 3/2003 345/208 |
| 2013/0234923 A1* | 9/2013 | Machida ................ G09G 3/344 345/107 |
| 2013/0271519 A1* | 10/2013 | Kubo ................... B41J 2/04581 347/10 |
| 2014/0192034 A1* | 7/2014 | Yamazaki ............. G09G 3/344 345/208 |

FOREIGN PATENT DOCUMENTS

| | | |
|---|---|---|
| JP | 2010-139861 A | 6/2010 |
| JP | 2012-181507 A | 9/2012 |

* cited by examiner

DRIVING DEVICE OF DISPLAY MEDIUM, NON-TRANSITORY COMPUTER READABLE MEDIUM STORING DRIVING PROGRAM OF DISPLAY MEDIUM, AND DISPLAY

CROSS-REFERENCE TO RELATED APPLICATIONS

This application is based on and claims priority under 35 USC 119 from Japanese Patent Application No. 2013-099347 filed May 9, 2013.

BACKGROUND

Technical Field

The present invention relates to a driving device of a display medium, a non-transitory computer readable medium storing a driving program of a display medium, and a display.

SUMMARY

According to an aspect of the invention, there is provided a driving device of a display medium, including:

an application unit that applies a voltage with a pulse width corresponding to a density of a color to be displayed to each of plural pixels of a display medium in which plural kinds of particle groups having different movement starting voltages for movement between a pair of substrates according to an electric field and different colors are enclosed, the electric field being formed between the pair of substrates, at least one of which is transparent; and a controller that controls the application unit so that a first voltage with a pulse width corresponding to a density of a color of a first particle group of the plural kinds of particle groups finishes being applied to each of the plural pixels, and then a second voltage with a pulse width corresponding to a density of a color of a second particle group of the plural kinds of particle groups is applied thereto.

BRIEF DESCRIPTION OF THE DRAWINGS

Exemplary embodiments of the present invention will be described in detail based on the following figures, wherein.

DETAILED DESCRIPTION

Figure 1:
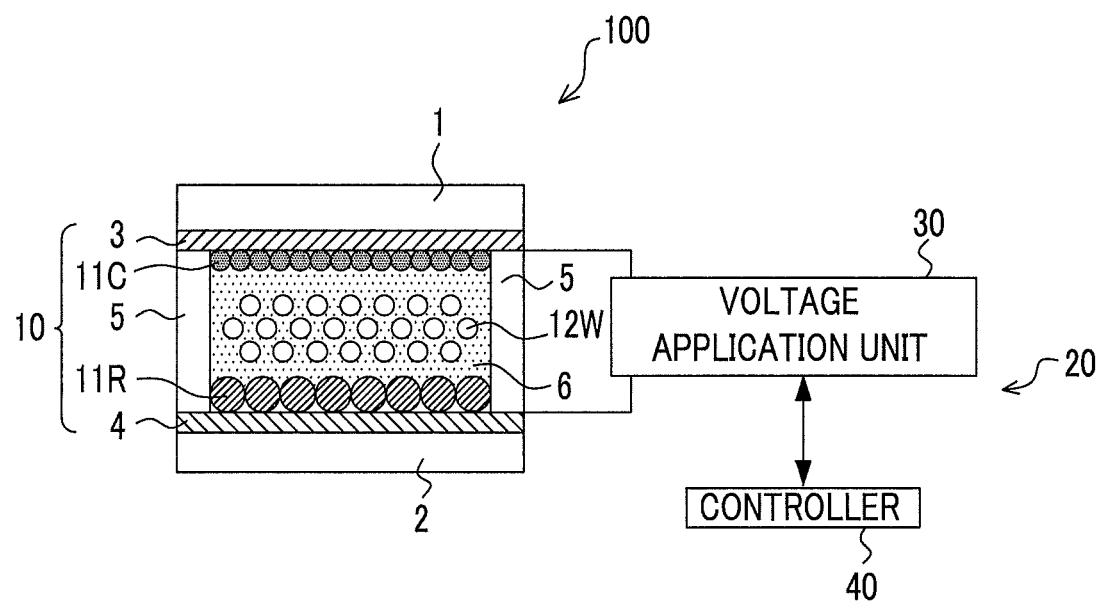
FIG. 1 is a schematic diagram of a display according to first and third exemplary embodiments.

Hereinafter, exemplary embodiments of the invention will be described in detail with reference to the drawings. The same reference numeral is given to members having the same operation and function throughout all the drawings, and repeated description thereof may be omitted. In addition, a display medium according to the present exemplary embodiments includes plural pixels, but, for simplification of description, the present exemplary embodiments will be described using the drawings in which attention is paid to a single pixel.

Further, cyan is indicated by the reference sign C, red is indicated by the reference sign R, magenta is indicated by the reference sign M, and white is indicated by the reference sign W. Furthermore, if colors are required to be differentiated from each other when characteristics or the like are described, the color reference signs (C, R, M, and W) corresponding to the respective colors are added to the ends of the reference numerals for differentiating the colors from each other.

In addition, a cyan particle is denoted by a cyan particle C, a red particle is denoted by a red particle R, a magenta particle is denoted by a magenta particle M, and a white particle is denoted by a white particle W, and each particle and a particle group thereof are indicated by the same reference sign.

First Exemplary Embodiment

FIG. 1 is a diagram schematically illustrating a display 100 according to the first exemplary embodiment. The display 100 includes a display medium 10 and a driving device 20 driving the display medium 10. The driving device 20 includes a voltage application unit 30 which applies a voltage between a display side electrode 3 and a rear side electrode 4 of the display medium 10, and a controller 40 which controls the voltage application unit 30 according to image information of an image displayed on the display medium 10.

In the display medium 10, a translucent display substrate 1 which is an image display surface and a rear substrate 2 which is a non-display surface are disposed so as to be opposed to each other with a gap therebetween. In addition, a spacer 5 is provided which maintains a gap between the substrates 1 and 2 to be constant and partitions the substrates 1 and 2 into plural pixels. Further, both the display substrate 1 and the rear substrate 2 may be translucent.

The pixel indicates a region surrounded by the rear substrate 2 provided with the rear side electrode 4, the display substrate 1 provided with the display side electrode 3, and the spacers 5. In the pixel, a dispersion medium 6 made of, for example, an insulating liquid, a cyan particle group 11C, a red particle group 11R, and a white particle group 12W dispersed in the dispersion medium 6 are enclosed.

Alternatively, when the respective pixels are formed by active matrix type address electrodes as described later, plural pixel electrodes, for example, four address electrodes which include two address electrodes adjacent horizontally and two address electrodes adjacent vertically may be surrounded by a series of spacers 5 so as to form a single connected cell. In this case, each address electrode may be considered to be a single pixel, and plural address electrodes may be considered to form a single pixel.

Both of the particle group 11C and the particle group 11R according to the present exemplary embodiment are charged to, for example, a positive polarity, and have characteristics in which the particle groups 11 migrate between a pair of electrodes 3 and 4 by applying a voltage exceeding a predefined threshold value between a pair of electrodes 3 and 4. In addition, there is no limitation of a charge polarity of the particle group 11C and the particle group 11R, and both of the two may be charged to a negative polarity, or the two groups may be charged to different polarities.

Further, a particle diameter of the particle 11C according to the present exemplary embodiment is smaller than a particle diameter of, for example, the particle 11R, and is a particle diameter of an extent in which the particle passes through the gap between the cohering particles 11R even in a state in which the particles 11R are attached to either of the substrates so as to cohere by applying a voltage exceeding a predefined threshold value between a pair of electrodes 3 and 4. Furthermore, particle diameters of the particle 11C and the particle 11R according to the present exemplary embodiment have no limitation, and may be appropriately set according to a charge polarity, responsiveness, and the like of the particle groups 11.

In addition, the particle group 11C according to the present exemplary embodiment is translucent, but is not limited thereto, and translucency of each particle may be appropriately set. Further, colors of the particle groups 11 may be different depending on the kinds of particle groups, and are not limited to cyan and red.

In contrast, a particle group 12W is a particle group having a charge amount smaller than the particle group 11C and the particle group 11R. For this reason, even if a voltage for making the particle groups 11 migrate to either of a pair of substrates 1 and 2 is applied between pair of electrodes 3 and 4, the particle group 12W migrates slower than the particle groups 11, and the particle group 12W is floated in the dispersion medium 6 without being attached to either of the substrates 1 and 2.

The driving device 20 (the voltage application unit 30 and the controller 40) applies a voltage corresponding to color information of an image to be displayed to the display side electrode 3 and the rear side electrode 4 so as to make the particles 11 in the dispersion medium 6 migrate, thereby attaching the particles 11 with a particle amount corresponding to a display density (hereinafter, referred to as a gradation) for each particle color included in the image information of an image to either of a pair of substrates 1 and 2 so as to display an image on the display medium 10.

The voltage application unit 30 applies a voltage to the display side electrode 3 and the rear side electrode 4 and is electrically connected to the display side electrode 3 and the rear side electrode 4. In addition, the voltage application unit 30 is connected to the controller 40 and applies a voltage responding to control of the controller 40 to the display side electrode 3 and the rear side electrode 4.

Figure 2:
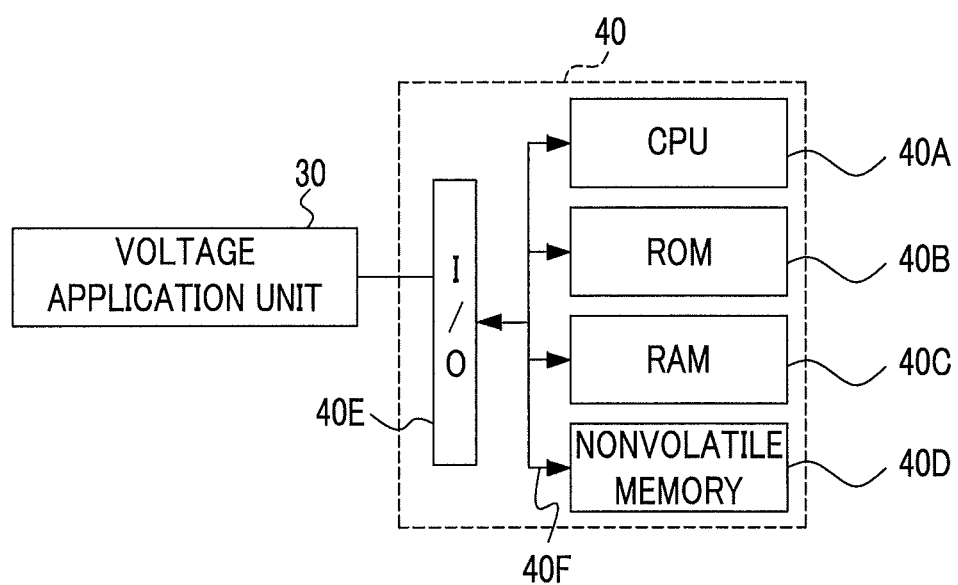
FIG. 2 is a block diagram illustrating a configuration of a main part of an electrical system of the display.

The controller 40 is formed by, for example, a computer as illustrated in FIG. 2. The computer 40 has a configuration in which a central processing unit (CPU) 40A, a read only memory (ROM) 40B, a random access memory (RAM) 40C, a nonvolatile memory 40D, and an input and output interface (I/O) 40E are connected to each other via a bus 40F, and the voltage application unit 30 is connected to the I/O 40E.

In this case, for example, a voltage application program described later is written in the ROM 40B of the computer 40, and is read by the CPU 40A so as to control the voltage application unit 30.

The nonvolatile memory 40D may be connected to an external device of the computer 40 via the I/O 40E, and may be an external storage device such as, for example, a memory card.

In addition, in the present exemplary embodiment, the display side electrode 3 is grounded, and a voltage is applied to the rear side electrode 4, as an example.

Figure 3:
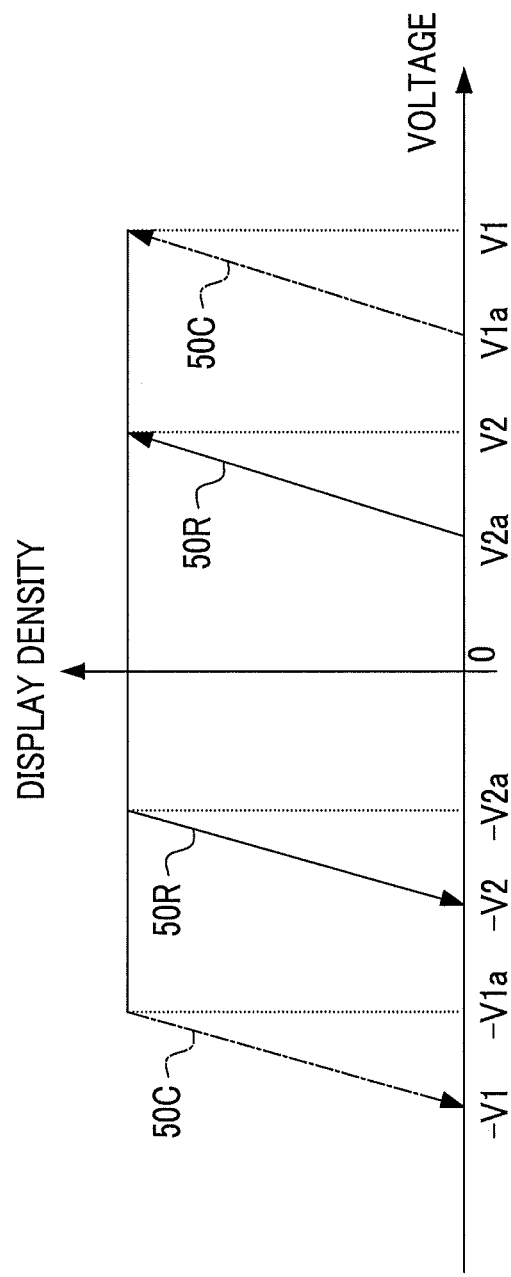
FIG. 3 is a diagram illustrating threshold characteristics of a particle group according to the first and third exemplary embodiments.

FIG. 3 illustrates characteristics (hereinafter, referred to as threshold characteristics) of an application voltage which is required to move the particle group 11C and the particle group 11R to the display substrate 1 side or the rear substrate 2 side in the display 100 according to the present exemplary embodiment.

In FIG. 3, threshold characteristics of the particle group 11C are indicated by characteristics 50C, and threshold characteristics of the particle group 11R are indicated by characteristics 50R. In addition, the transverse axis of FIG. 3 expresses a voltage applied to the rear side electrode 4, and the longitudinal axis expresses a display density of the particle groups 11.

In relation to the particle group 11C, when a voltage exceeding a threshold value V1a is applied to the rear side electrode 4, the particle group 11C which is attached to the rear substrate 2 is separated from the rear substrate 2, and is moved to the display substrate 1 side according to an electric field formed between the substrates 1 and 2. In addition, in relation to the particle group 11C, when a voltage exceeding a threshold value −V1a is applied to the rear side electrode 4, the particle group 11C which is attached to the display substrate 1 is separated from the display substrate 1 and is moved to the rear substrate 2 side according to an electric field formed between the substrates 1 and 2.

On the other hand, in relation to the particle group 11R, when a voltage exceeding a threshold value V2a is applied to the rear side electrode 4, the particle group 11R which is attached to the rear substrate 2 starts being separated from the rear substrate 2, and is moved to the display substrate 1 side according to an electric field formed between the substrates 1 and 2. In addition, in relation to the particle group 11R, when a voltage exceeding a threshold value −V2a is applied to the rear side electrode 4, the particle group 11R which is attached to the display substrate 1 starts being separated from the display substrate 1 and is moved to the rear substrate 2 side according to an electric field formed between the substrates 1 and 2.

Further, the magnitudes of the threshold values of the particle group 11C and the particle group 11R have a relationship of $||V2a|<|V2|<|V1a|<|V1||$, but the magnitudes of the threshold values of the particle groups 11 are not limited thereto.

In addition, the threshold value indicates energy required to separate the particle group 11 from the display substrate 1 or the rear substrate 2, that is, movement starting energy of the particle group 11 by releasing the attraction between the particles 11 or the attraction between the particle group 11 and the substrates 1 and 2 due to, for example, Van der Waals forces, intermolecular forces, and the like acting on the particle group 11 attached to either of the display substrate 1 and the rear substrate 2, and the attraction between the particle group 11 and the substrates 1 and 2 due to image forces and the like.

The movement starting energy of the particle group 11 depends on a voltage applied between the substrates 1 and 2 and an application time of the voltage.

Therefore, even if a voltage required to release the attraction between the particles 11 or the attraction between the particle groups 11 and the substrates 1 and 2 is applied, when the voltage stops being applied before reaching energy required to separate the particle groups 11 from the substrates 1 and 2, the particle groups 11 are not separated from the substrates 1 and 2 and remain attached to either one of the substrates 1 and 2.

Although, in the present exemplary embodiment, for convenience of description, a threshold value is described as a voltage for separating the particle groups 11 from the display substrate 1 and the rear substrate 2, that is, a movement starting voltage, the threshold value is not a value just indicated by an application voltage applied between the substrates 1 and 2 but a value defined by an application voltage applied between the substrates 1 and 2 and an application time of the application voltage.

Next, detailed description will be made of driving control of the particle group 11C and the particle group 11R having the threshold characteristics illustrated in FIG. 3, performed by the driving device 20.

FIGS. 4A to 4D schematically illustrate an example of behaviors of the particle groups 11 according to an application voltage applied by the driving device 20 in the display medium 10 according to the present exemplary embodiment. In addition, in FIGS. 4A to 4D, the dispersion medium 6 and the spacer 5 are not illustrated, and the display side electrode 3 is assumed to be grounded.

Figure 4A:
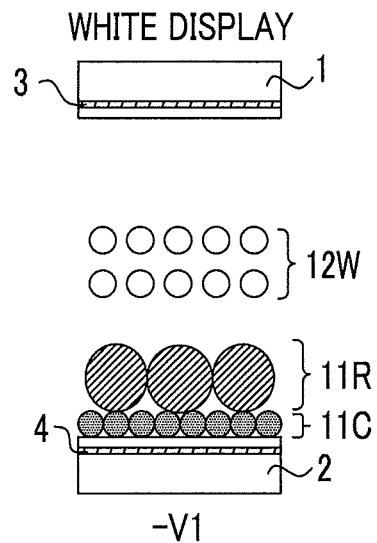
FIGS. 4A to 4D are schematic diagrams illustrating a behavior of the particle group according to an application voltage.

As illustrated in FIG. 4A, when the voltage $-V1$ required to separate the particle group 11C and the particle group 11R on the display substrate 1 side and attach the groups to the rear substrate 2 side is applied to the rear side electrode 4, the particle group 11C and the particle group 11R migrate to the rear substrate 2 side and are attached to the entire surface of the rear substrate 2 side. On the other hand, the particle group 12W is floated in the dispersion medium 6 without being attached to either of the substrates 1 and 2 even if the voltage $-V1$ is applied to the rear side electrode 4. Accordingly, the particle group 12W is visually recognized from the display substrate 1 side, and thus white is displayed.

Figure 4B:
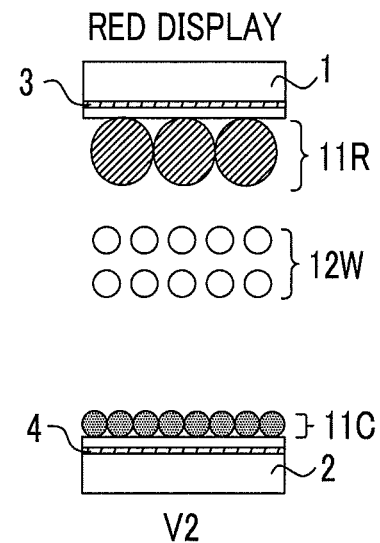

When the voltage V2 is applied to the rear side electrode 4 in the state of FIG. 4A, as illustrated in FIG. 4B, the particle group 11R migrates from the rear substrate 2 side to the display substrate 1 side and is attached to the entire surface of the display substrate 1 side. Accordingly, the particle group 11R is visually recognized from the display substrate 1 side, and thus red is displayed.

Figure 4C:
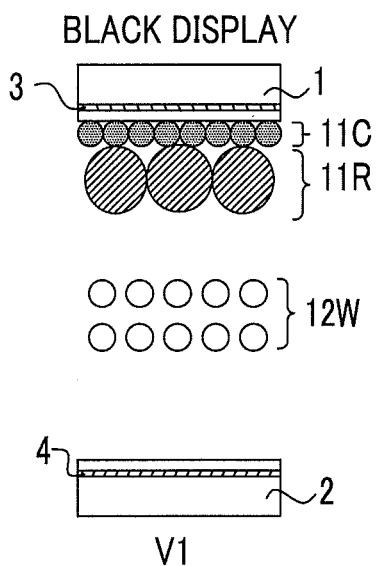
Figure 4D:
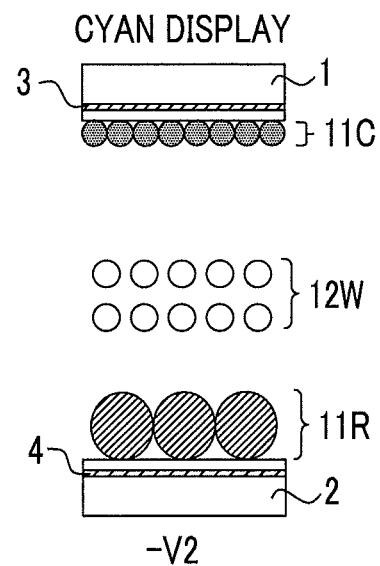

When the voltage V1 is applied to the rear side electrode 4 in the state of FIG. 4B, as illustrated in FIG. 4C, the particle group 11C migrates from the rear substrate 2 side to the display substrate 1 side, and passes through the gaps of the particle group 11R which has already been attached to the display substrate 1 side so as to be attached to the entire surface of the display substrate 1 side. Accordingly, black, which is a mixed color of cyan and red of the particle group 11R, is displayed from the display substrate 1 side through the translucent particle group 11C.

When the voltage $-V2$ is applied to the rear side electrode 4 in the state of FIG. 4C, the particle group 11R migrates from the display substrate 1 side to the rear substrate 2 side and is attached to the entire surface of the rear substrate 2, but the particle group 11C remains attached to the entire surface of the display substrate 1. Accordingly, the particle group 11C is visually recognized from the display substrate 1 side, and thus cyan is displayed.

In addition, although, in the example of FIGS. 4A to 4D, a description has been made of a case where each color is displayed at a density of 100% by attaching the particle group 11C and the particle group 11R to the display substrate 1 side, when an intermediate color is displayed based on color information of an image to be displayed on the display medium 10, an application time of a voltage applied to the rear side electrode 4 may be controlled so that the particles 11 with a particle amount corresponding to a gradation are attached to the display substrate 1 side for each of the particle group 11C and the particle group 11R.

In the present exemplary embodiment, for example, a so-called active matrix type driving method is used in which the rear side electrode 4 is formed by a TFT electrode, n horizontal scanning lines (address lines Y1 to Yn) and m vertical signal lines (data lines X1 to Xm) are formed in a matrix, and the rear side electrode 4 for each pixel is disposed at an intersection thereof.

In this case, the scanning line is connected to a gate of the rear side electrode 4, and is used to apply a voltage for determining turned-on and turned-off of the TFT electrode thereto. The signal line is connected to a drain or a source of the rear side electrode 4, and is used to apply a voltage (hereinafter, referred to as a gradation voltage) for determining a gradation of a display color.

In other words, the rear side electrode 4 on the scanning line is turned on through one Yi (where i=-1 to n) of the scanning lines, and a gradation voltage is applied to the rear side electrode 4 from the signal line. The scanning is performed over all the scanning lines Y1 to Yn (one frame), and thus an image displayed on the display medium 10 is rewritten.

Therefore, an application time of a gradation voltage applied to the rear side electrode 4 is variable by controlling the number of frames for applying a voltage. In addition, the rear side electrode 4 is not limited to a TFT electrode.

Figure 5:
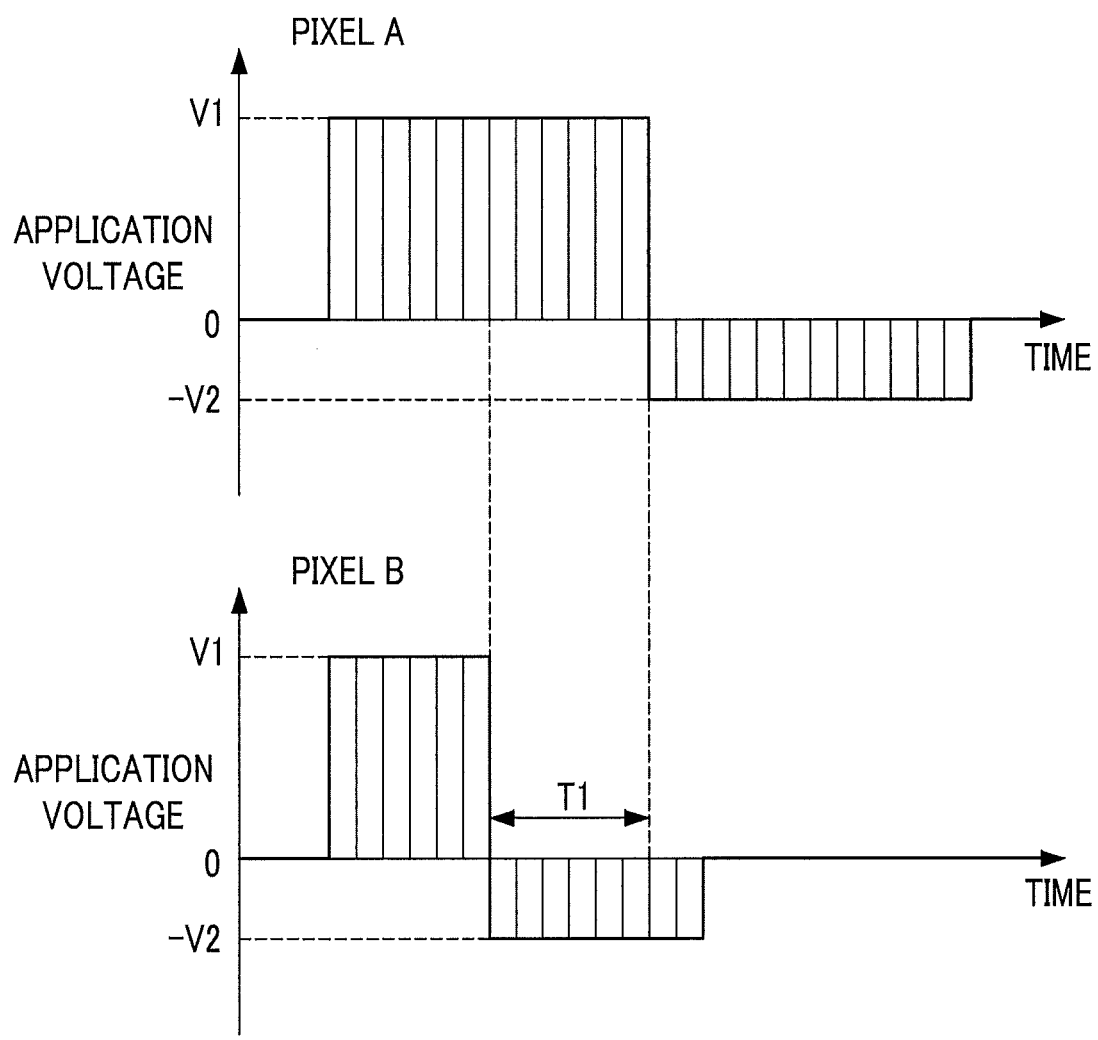
FIG. 5 is a diagram illustrating a voltage application sequence in the related art.

FIG. 5 is a diagram illustrating an example of control of a voltage applied to each pixel included in the display medium 10 when an image is displayed on the display medium 10. In addition, the division of the voltage V1 and the voltage V2 into plural regions indicates that the voltage V1 and the voltage V2 are applied over plural frames.

Here, for convenience of description, the description will be made by paying attention to two pixels including a pixel A and a pixel B included in the display medium 10, but the description is applied to all the pixels included in the display medium 10.

When a gradation of the particle group 11C displayed by the pixel A is higher than a gradation of the particle group 11C displayed by the pixel B, more particles 11C are required to be moved to the display substrate 1 side in the pixel A than in the pixel B, and thus an application time of the voltage V1 to the pixel A is longer than an application time of the voltage V1 to the pixel B.

On the other hand, in the pixel B, the particles 11C with a particle amount corresponding to a targeted gradation have been moved to the display substrate 1 during the application of the voltage V1 in the pixel A, and, thus, for example, the voltage $-V2$ is consecutively applied as a gradation voltage of the particle group 11R.

Therefore, in a period T1, a potential difference (hereinafter, referred to as an inter-pixel potential difference) between the pixel A and the pixel B is (V1+V2), but influence thereof on the particle groups 11 included in the pixel A and the pixel B is unable to be disregarded, and thus there are cases where accuracy of gradations of display colors displayed by the pixel A and the pixel B deteriorates.

Thus, hereinafter, a description will be made of a voltage application process in which the CPU 40A of the controller 40 of the display 100 reads and executes a program for controlling a voltage applied to each pixel when an image is displayed, so as to reduce an inter-pixel potential difference of the display medium 10, such that a gradation of each pixel included in the display medium 10 is able to be controlled with high accuracy.

In this case, a form in which the program is installed in the ROM 40B of the controller 40 of the display 100 in advance, a form in which the program is provided in a state of being stored on a computer readable recording medium such as a CD-ROM, a form in which the program is delivered via a wire or wireless communication unit, or the like may be employed.

First, with reference to FIG. 6, a description will be made of an operation of the display 100 when a voltage application process according to the present exemplary embodiment is performed.

Figure 6:
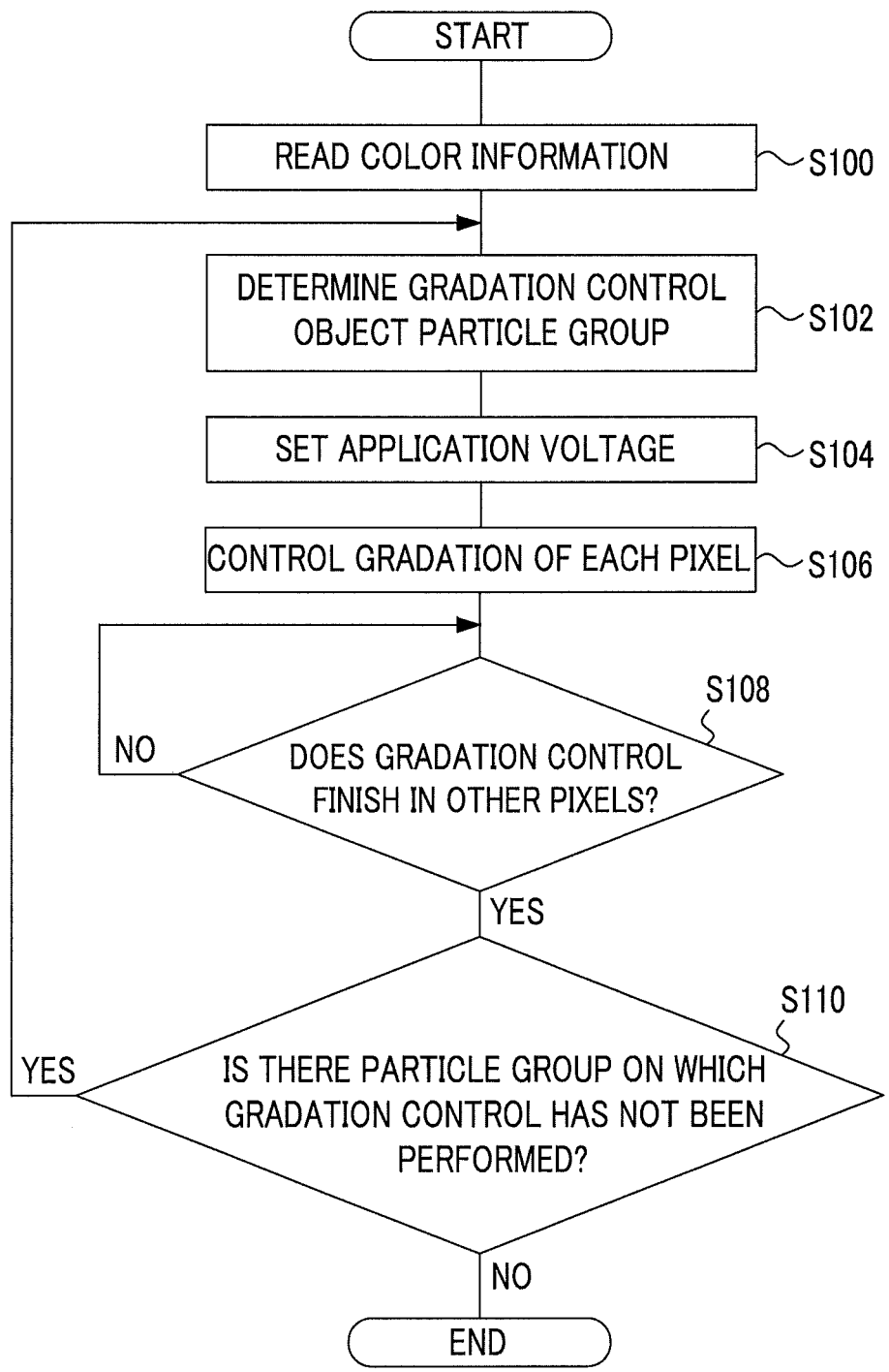
FIG. 6 is a flowchart of a voltage application process according to the first exemplary embodiment and a second exemplary embodiment.

In addition, FIG. 6 is a flowchart illustrating a flow of processes performed by a driving program of the display medium 10 which is executed by the CPU 40A of the controller 40 of the display 100 at this time, and the program is stored in advance in a predefined region of the ROM 40B and is executed by the CPU 40A each time the display medium 10 is requested to display an image.

Further, as an example, it is assumed that the voltage −V1 is applied in advance to each pixel included in the display medium 10 before the voltage application process of FIG. 6 is performed, and thus the particle groups 11 of each pixel is in the state illustrated in FIG. 4A.

First, in step S100, for example, color information of an image which is displayed on the display medium 10 and is stored in advance in a predefined region of the nonvolatile memory 40D is acquired.

Here, the color information of an image is information for uniquely expressing a display color for each pixel of the image, such as, for example, RGB data or CMY data, and color information of an image according to the present exemplary embodiment is assumed to be given as, for example, gradation values of cyan and red for each pixel.

In step S102, the kind of particle group 11 which is a gradation control object is determined.

In this case, for example, the particle group 11 with the highest movement starting voltage may be determined as a gradation control object among the kinds of particle groups 11 which have not yet been gradation control objects in the particle groups 11 included in the pixels. In the present exemplary embodiment, first, the particle group 11C is selected as a gradation control object.

In step S104, an absolute value of an application voltage applied between the substrates 1 and 2 is acquired and set from, for example, a predefined region of the nonvolatile memory 40D in order to control a gradation of the particle group 11 selected in step S102.

Here, the absolute value of an application voltage for controlling a gradation of each particle group 11 is a voltage value larger than a movement starting voltage of each particle group 11, and is stored in advance, for example, in the predefined region of the nonvolatile memory 40D according to the kind of particle group 11.

In the present exemplary embodiment, the particle group 11C is selected as a gradation control object particle group in step S102, and, thus, for example, the voltage value |V1| is set.

In step S106, the application voltage set in step S104 is applied to the rear side electrode 4 corresponding to each pixel so as to start gradation control for each pixel.

In this case, since the particle group 11C is charged to a positive polarity, a polarity of the application voltage may be set to be positive when a gradation of the particle group 11C is to be increased, and may be set to be negative when a gradation thereof is to be decreased, and, here, a positive polarity is selected.

In addition, an application time of the application voltage is determined for each pixel according to a gradation value of the particle group 11 designated by the color information.

A relationship between a gradation value, an application voltage, and an application time of the particle group 11 is obtained in advance through a test using a practical display 100, computer simulation based on a design specification of the display 100, or the like, and is stored in advance, for example, in the nonvolatile memory 40D as a voltage application time table.

Therefore, in the present exemplary embodiment, the voltage application time table is referred to, and thus an application time for obtaining a targeted gradation value when the voltage V1 is applied to the particle group 11C is determined for each pixel. In addition, the voltage V1 is applied to the rear side electrode 4 of each pixel according to the determined application time.

In step S108, it is determined that the application of the voltage V1 finishes in pixels other than the pixel itself in the respective pixels included in the display medium 10. If a result of the determination is negative, the process in this step is repeatedly performed until the application of the voltage V1 finishes in the other pixels. If a result of the determination is affirmative, the flow proceeds to step S110.

Here, the other pixels are, for example, pixels in which a gradation of the particle group 11C is the highest, that is, pixels in which an application time of the gradation voltage V1 is the longest, among the pixels included in the display medium 10. In this case, the flow does not proceed to step S110 until the application of the gradation voltage V1 to the pixels in which a gradation of the particle group 11C is the highest among the pixels included in the display medium 10 finishes. In other words, the flow does not proceed to step S110 until the application of the gradation voltage V1 to each of the pixels included in the display medium 10 finishes.

Figure 7:
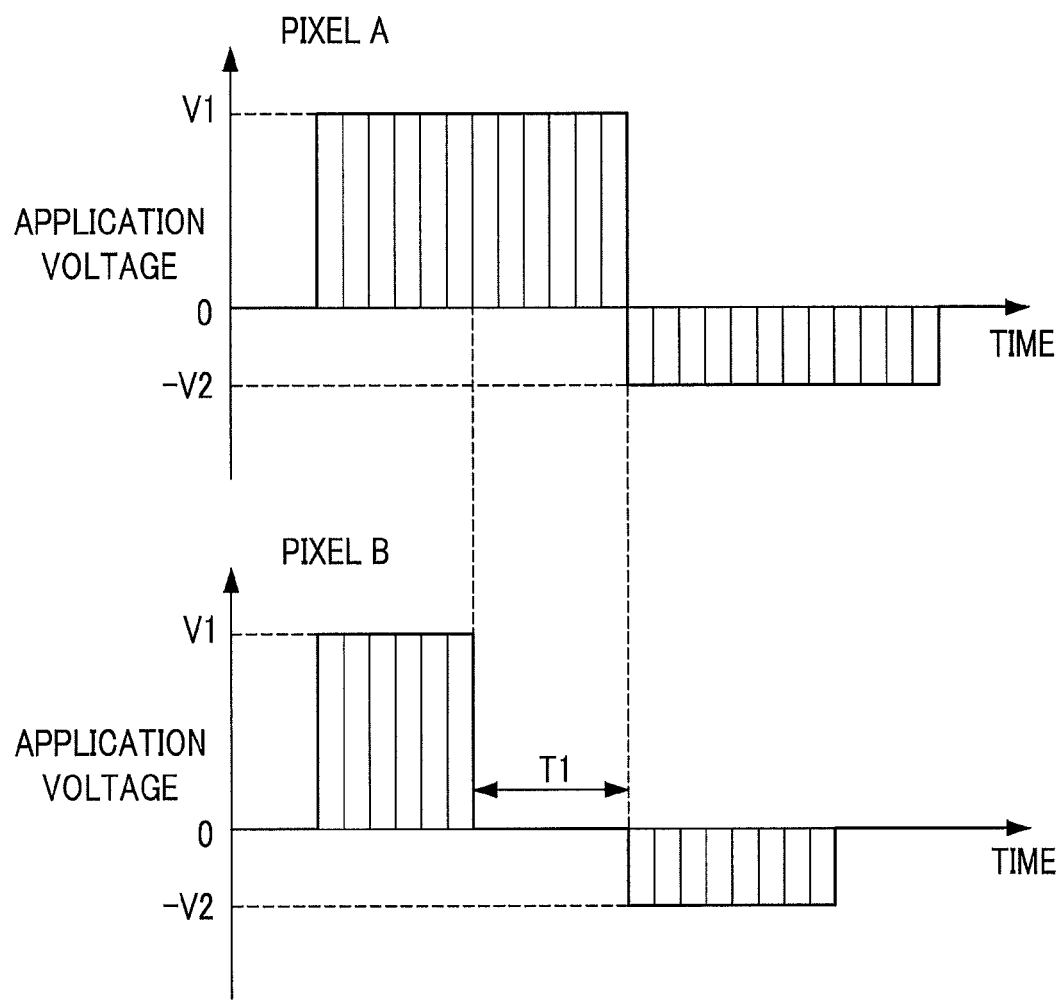
FIG. 7 is a diagram illustrating a voltage application process according to the first exemplary embodiment.

FIG. 7 is a diagram illustrating this state, and the pixel A corresponds to a pixel in which a gradation of the particle group 11C is the highest among the pixels included in the display medium 10.

In the period T1 after the application of the voltage V1 finishes until the application of the voltage V1 to the pixel A finishes, a voltage is not applied to the pixel B, unlike in the period T1 of the pixel B in FIG. 5.

Therefore, an inter-pixel potential difference in the period T1 is V1 and is thus lower than an inter-pixel potential difference (V1+V2) in FIG. 5, and thus influence of the inter-pixel potential difference on the particle groups 11 of the pixel A and the pixel B is reduced.

As described above, due to the processes in steps S102 to S108, a gradation of the particle group 11C for each pixel is determined.

In step S110, it is determined whether or not there is a particle group 11 which has not yet been a gradation control object among the particle groups 11 included in each pixel.

If a result of the determination is negative, this voltage application process ends, and if a result of the determination is affirmative, the flow proceeds to step S102 such that the particle group 11 which is the next gradation control object is determined.

In the present exemplary embodiment, since gradation control of the particle group 11R has not yet been performed, the flow proceeds to step S102 such that the particle group 11R is selected as a gradation control object.

In addition, in step S104, for example, a voltage value |V2| is set as a voltage value for controlling a gradation of the particle group 11R. In step S106, a polarity of the voltage value |V2| and an application time for each pixel are set, and an application voltage is applied to each pixel.

In addition, in relation to a polarity of the application voltage, if a particle amount of the particle group 11R which is attached to the display substrate 1 side along with the particle group 11C by the voltage V1 which is a gradation voltage of the particle group 11C is larger than a particle amount corresponding to a gradation of the particle group 11R designated by the color information of an image, a negative polarity is set, and if smaller, a positive polarity is set.

In addition, an application time of the application voltage is determined from the set application voltage and gradation value of the particle group 11C by referring to the voltage application time table.

As above, according to the present exemplary embodiment, when a voltage for adjusting a gradation of each kind of particle group 11 is applied to the display medium 10 formed by plural pixels, each of which includes two kinds of particle groups 11 having different threshold characteristics and colors according to color information of an image displayed on the display medium 10, a voltage for adjusting a gradation of the next kind of particle group is applied after waiting for the application of the voltage for adjusting of the gradation of the particle group 11 in other pixels included in the display medium 10 to finish.

Therefore, influence of an inter-pixel potential difference on the particle groups 11 of each pixel is reduced.

Second Exemplary Embodiment

Next, a description will be made of an operation of the display 100 when a voltage application process according to the second exemplary embodiment of the invention is performed.

The second exemplary embodiment is different from the first exemplary embodiment in that a magenta particle group 11M is added to each pixel of the display medium 10 in the first exemplary embodiment and thus three kinds of particle groups 11 are included in each pixel, and other configurations thereof are the same as in the first exemplary embodiment.

Figure 8:
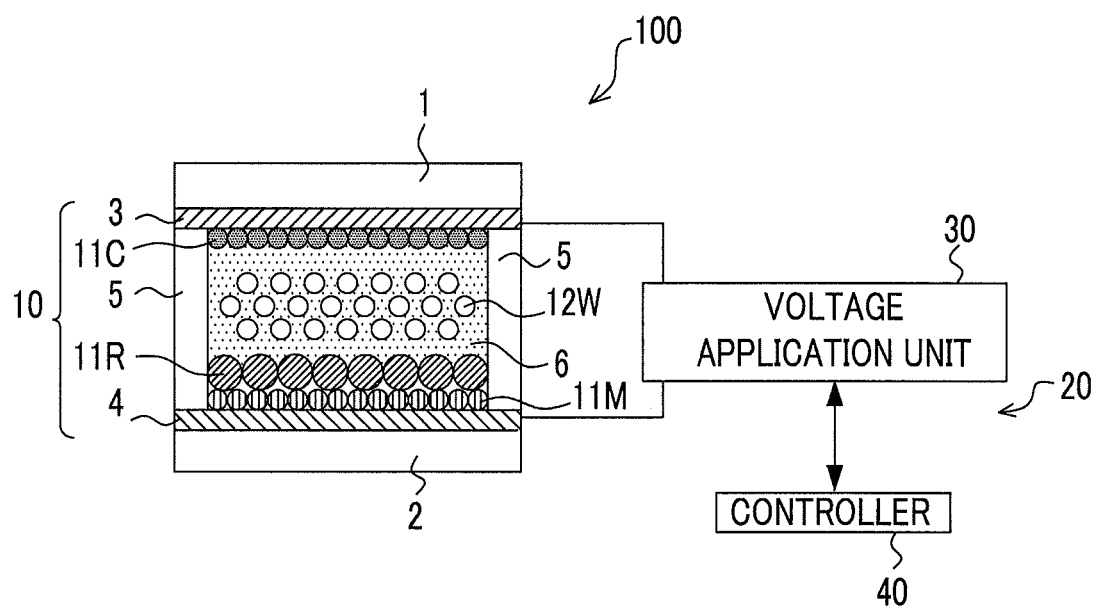
FIG. 8 is a schematic diagram of a display according to the second exemplary embodiment.

FIG. 8 is a diagram schematically illustrating a display 100 according to the second exemplary embodiment, and the magenta particle group 11M is added to the dispersion medium 6 of the display medium 10 of FIG. 1.

In the present exemplary embodiment, the particle group 11M is charged to, for example, the same polarity as a polarity of the particle group 11C and the particle group 11R, that is, a positive polarity, but a polarity of the particle group 11 is not limited thereto and may be a negative polarity, and there is no limitation of charge polarity.

In addition, in the present exemplary embodiment, a particle diameter of the particle 11M is substantially the same as a particle diameter of, for example, the particles 11C, but there is no limitation of a particle diameter, and may be appropriately set according to a charge polarity, responsiveness, and the like of the particle groups 11.

Further, the particle group 11M according to the present exemplary embodiment has no limitation of translucency or a color.

Figure 9:
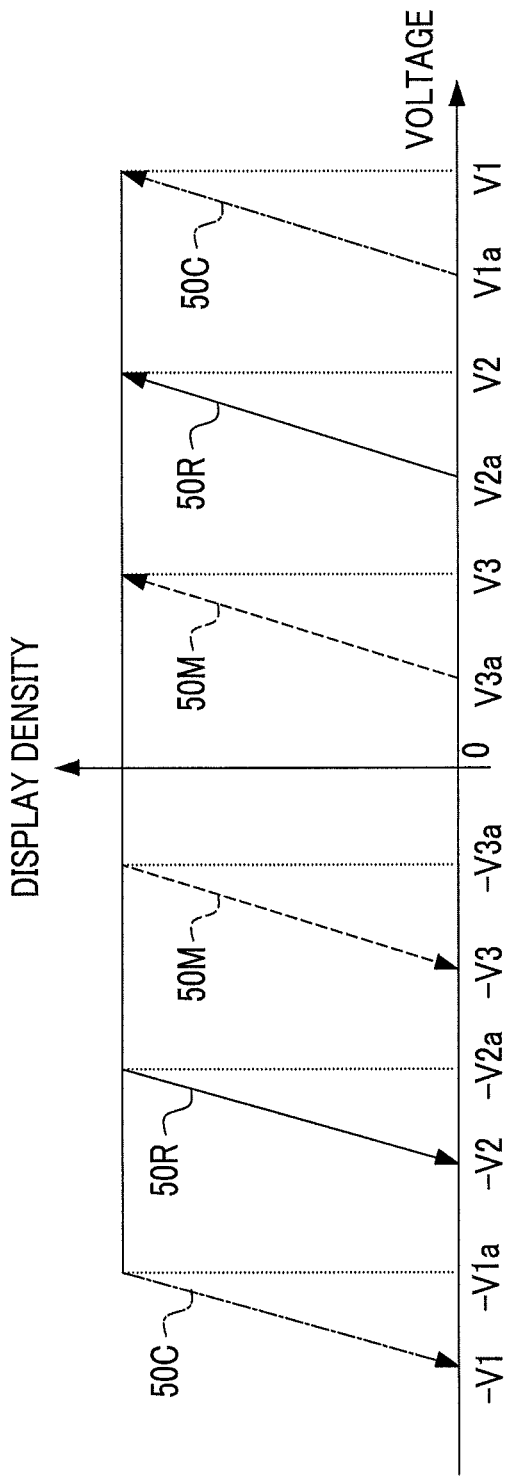
FIG. 9 is a diagram illustrating threshold characteristics of a particle group according to the second exemplary embodiment.

FIG. 9 illustrates threshold characteristics of each particle group 11 in the display 100 according to the present exemplary embodiment.

In FIG. 9, threshold characteristics of the particle group 11M are indicated by 50M, and, for example, threshold values of the particle group 11M are set to a voltage V3a and a voltage −V3a lower than the threshold values of the particle group 11C and the particle group 11R.

In other words, the magnitudes of the threshold values of the particle groups 11 have a relationship of |V3a|<|V3|<|V2a|<|V2|<|V1a|<|V1|, but the magnitudes of the threshold values of the particle groups 11 are not limited thereto.

In this case, when a voltage exceeding a threshold value V3a, for example, the voltage V3, is applied to the rear side electrode 4, the particle group 11M which is attached to the rear substrate 2 is separated from the rear substrate 2, and is moved to the display substrate 1 side according to an electric field formed between the substrates 1 and 2. In addition, when a voltage exceeding a threshold value −V3a, for example, the voltage −V3, is applied to the rear side electrode 4, the particle group 11M which is attached to the display substrate 1 is separated from the display substrate 1 and is moved to the rear substrate 2 side according to an electric field formed between the substrates 1 and 2.

Figure 10:
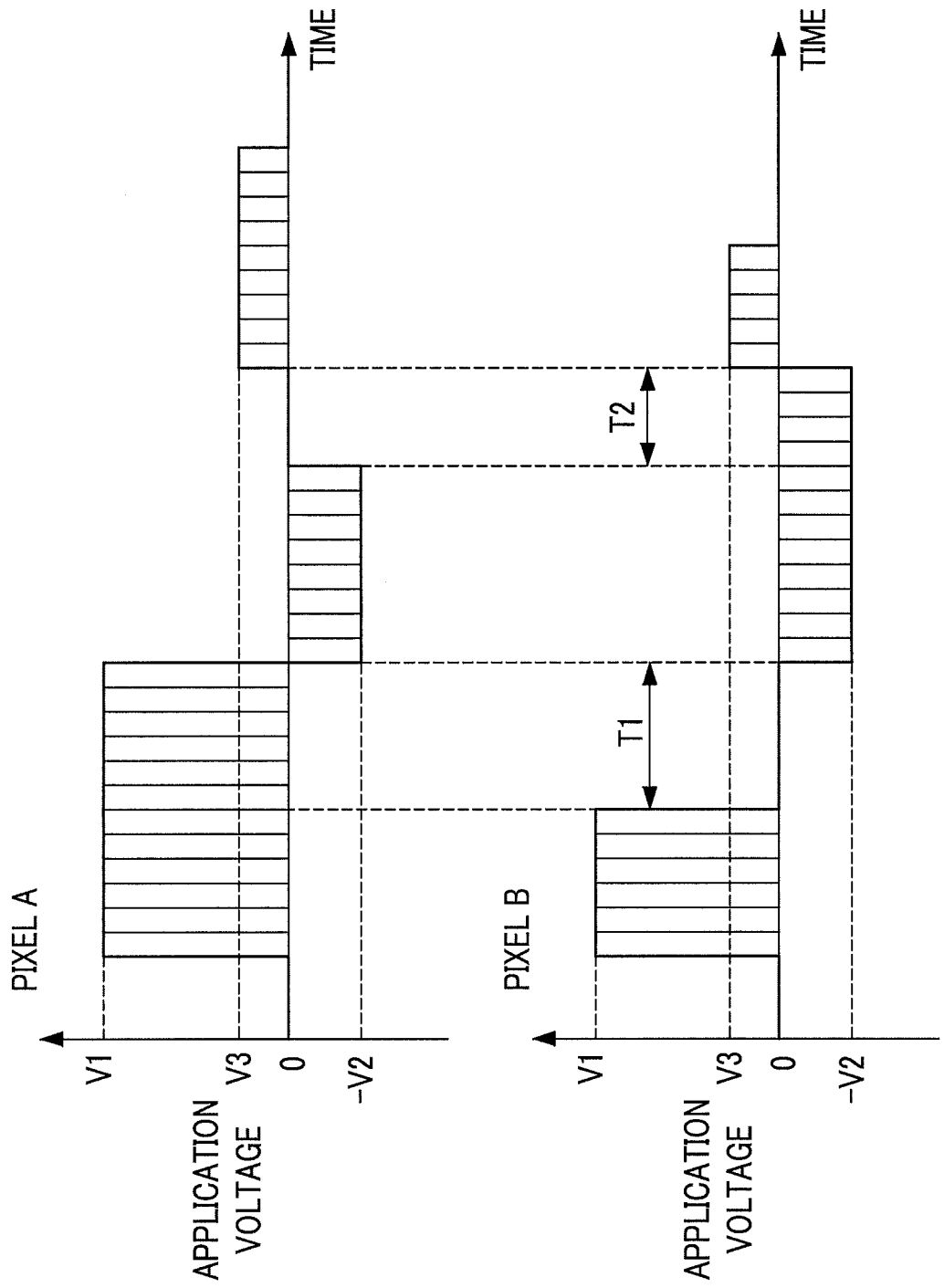
FIG. 10 is a diagram illustrating a voltage application process according to the second exemplary embodiment.

FIG. 10 is a diagram illustrating an example of voltage application circumstances when the voltage application process illustrated in FIG. 6 described in the first exemplary embodiment is applied to the display 100 according to the present exemplary embodiment.

In step S102, the particle groups 11 are selected as a gradation control object in an order in which a movement starting voltage is higher, and thus a gradation of the particle group 11 is determined in an order of the particle group 11C, the particle group 11R, and the particle group 11M. In addition, here, a description will be made assuming that a gradation of the particle group 11C is higher in the pixel A than in the pixel B, and a gradation of the particle group 11R is higher in the pixel B than in the pixel A.

In this case, in the pixel B, the gradation voltage −V2 of the particle group 11R is applied after the application of the gradation voltage V1 of the particle group 11C finishes and then waiting for the application of the voltage V1 to finish in the pixel A is performed. On the other hand, in the pixel A, the gradation voltage V3 of the particle group 11M is applied after the application of the gradation voltage −V2 of the particle group 11R finishes, and then waiting for the application of the voltage −V2 to finish in the pixel B is performed.

In other words, an inter-pixel potential difference in the period T1 after the application of the voltage V1 finishes in the pixel B until the application of the voltage V1 finishes in the pixel A is the voltage V1. In addition, an inter-pixel potential difference in the period T2 after the application of the voltage −V2 finishes in the pixel A until the application of the voltage −V2 finishes in the pixel B is the voltage V2.

In contrast, when gradation voltages of the respective particle groups 11 are consecutively applied without controlling an application timing of a gradation voltage in the pixel A and the pixel B, an inter-pixel potential difference in the period T1 is (V1+V2), and an inter-pixel potential difference in the period T2 is (V2+V3). Accordingly, even when three kinds of particle groups 11 are included in each pixel of the display medium 10, influence of an inter-pixel potential difference on the particle groups 11 of each pixel is reduced.

In addition, even when three or more kinds of particle groups 11 having different movement starting voltages and colors are included in each pixel, the same effect may be achieved by the voltage application process according to the present exemplary embodiment. Further, in the present exemplary embodiment, three colors including cyan C, red R, and magenta M are exemplified as colors of the respective particle groups, but a combination of three colors including cyan C, magenta M, and yellow Y, a combination of three colors including red R, green G, and blue B, or the like may be employed.

Third Exemplary Embodiment

Next, a description will be made of an operation of a display 100 when a voltage application process according to the third exemplary embodiment of the invention is performed.

In the third exemplary embodiment, a process of delaying a voltage application timing of the particle group 11 is added to the voltage application process in the first exemplary embodiment illustrated in FIG. 6. In addition, a configuration of the display 100 according to the present exemplary embodiment and threshold characteristics of the particle group 11 included in each pixel of the display medium 10 are the same as in the display 100 according to the first exemplary embodiment.

Figure 11:
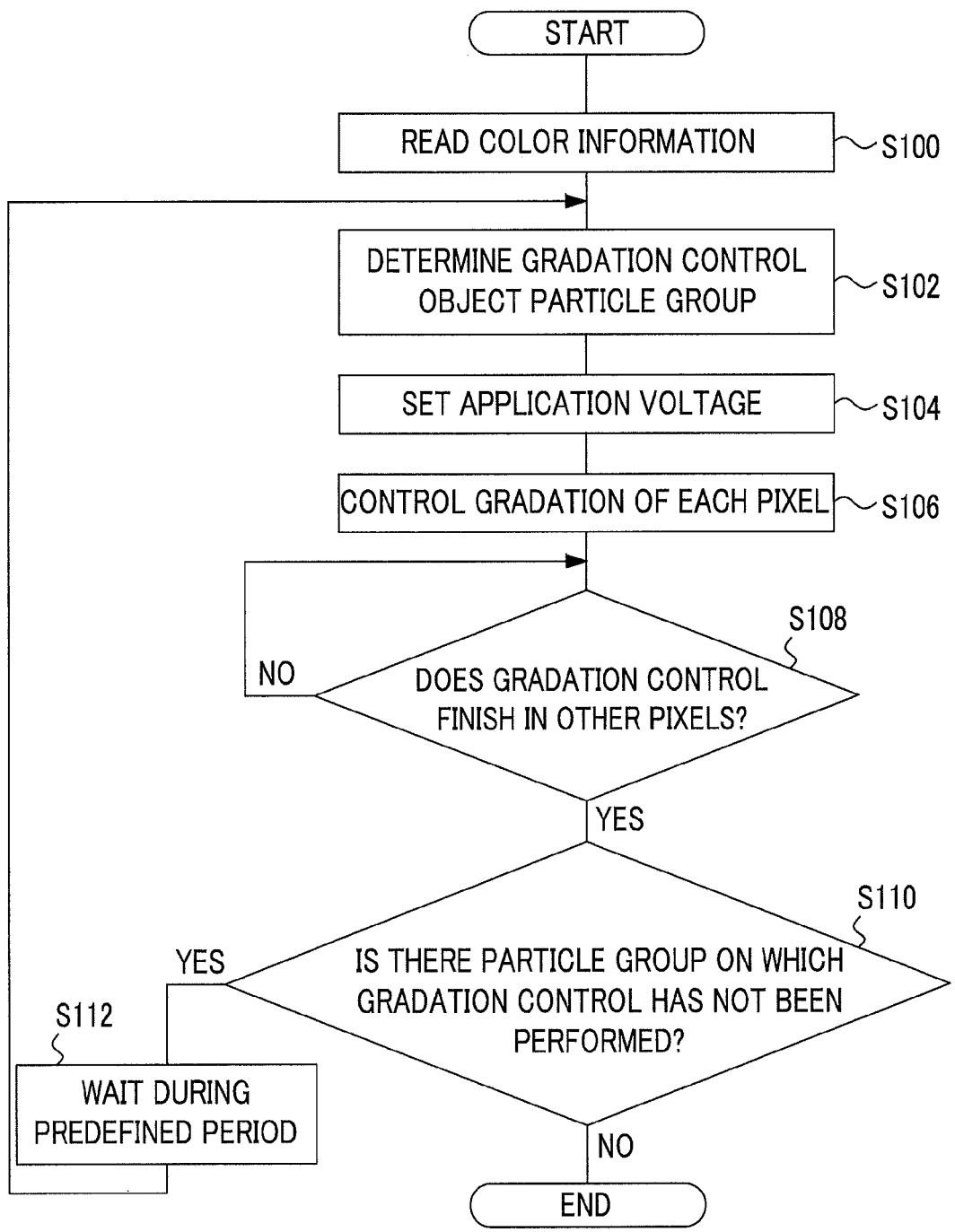
FIG. 11 is a flowchart of a voltage application process according to the third exemplary embodiment.

FIG. 11 is a flowchart illustrating a flow of processes performed by a driving program of the display medium 10 which is executed by the CPU 40A of the controller 40 of the display 100 according to the present exemplary embodiment, and the program is stored in advance in a predefined region of the ROM 40B and is executed by the CPU 40A each time the display medium 10 is requested to display an image.

A voltage application process according to the present exemplary embodiment is different from the first exemplary embodiment in that a process in step S112 and the other processes are the same as in the first exemplary embodiment, and thus description thereof will be omitted.

In step S112, a voltage stops being applied to each pixel after application of a gradation voltage of the particle group 11C finishes in each of the pixels included in the display medium 10 until a predefined period has elapsed.

The predefined period is a period required for the voltage application unit 30 to apply a voltage which is designated by the controller 40 to the electrodes 3 and 4 of each pixel with high accuracy.

An effect is expected in which a targeted voltage is applied with higher accuracy when a voltage temporarily stops being applied and the next targeted voltage is applied than when the voltage does not temporarily stop being applied, if the voltage application unit 30 changes a voltage to be applied.

Figure 12:
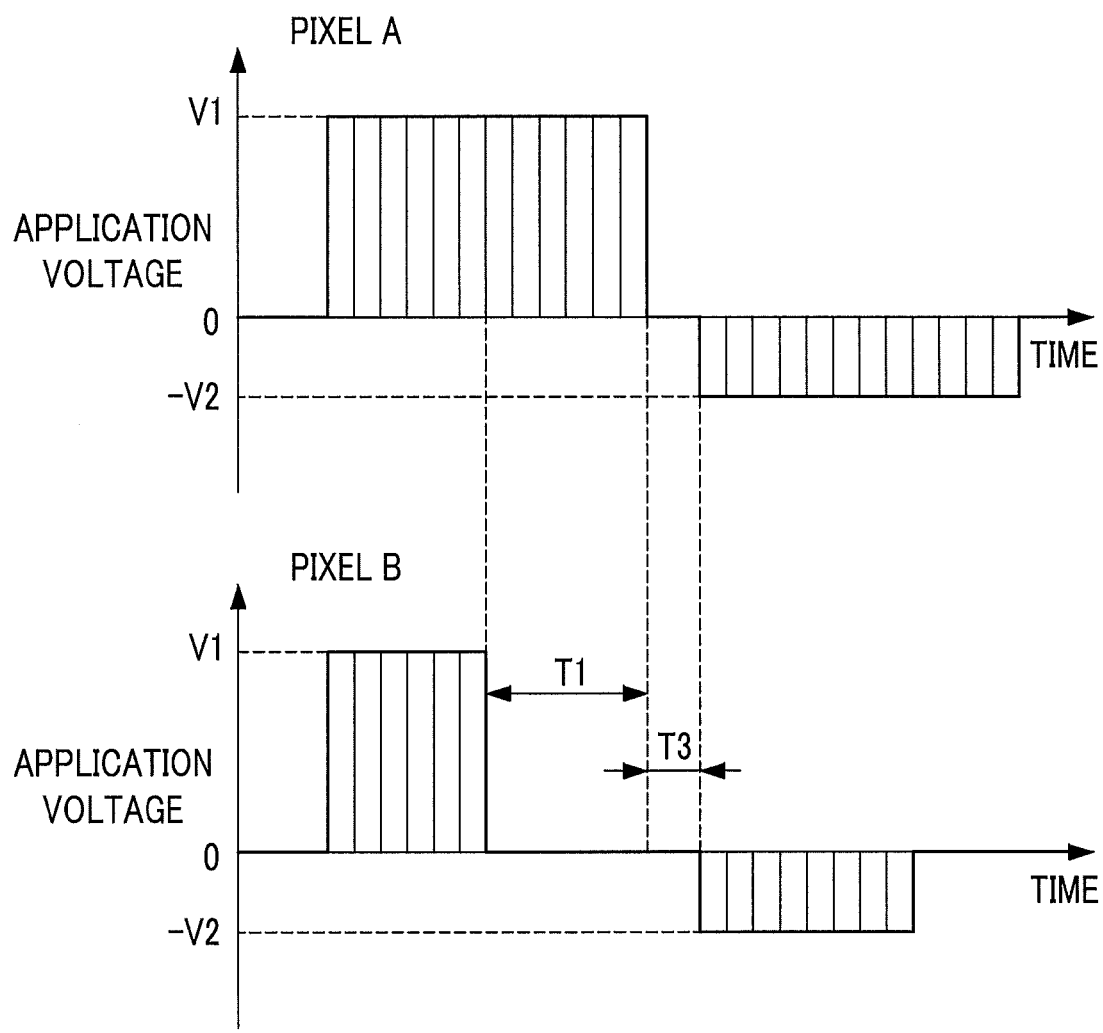
FIG. 12 is a diagram illustrating a voltage application process according to the third exemplary embodiment.

FIG. 12 is a diagram illustrating this state.

In the pixel A, the gradation voltage −V2 of the particle group 11R is applied after the gradation voltage V1 of the particle group 11C is applied, and then a period T3 which is a predefined period has elapsed.

In addition, in the pixel B, the voltage −V2 is applied after the period T1 has elapsed and then the period T3 has further elapsed, the period T1 being a period after the voltage V1 is applied until the application of the voltage V1 finishes in the pixel A.

In addition, the voltage application process according to the present exemplary embodiment may be performed on each pixel of the display medium 10 including three or more kinds of particle groups 11.

As above, although the exemplary embodiments of the invention have been described, the technical scope of the invention is not limited to the scope described in the exemplary embodiments. Various modifications or alterations may be given to the exemplary embodiments in the scope without departing from the spirit of the invention, and embodiments with the modifications or alterations are also included in the technical scope of the invention.

In addition, although, in the exemplary embodiments, a description has been made of a case where the voltage application process related to FIGS. 6 and 11 is realized by a software configuration, the invention is not limited thereto, and, for example, the voltage application process may be realized by a hardware configuration.

As a form example in this case, for example, there is a form in which a function device which performs the same process as the controller 40 is created so as to be used. In this case, it is expected that a process is performed at a higher speed than in the exemplary embodiments.

In addition, although, in each exemplary embodiment, when gradation control of the particle group 11 is performed, a voltage value of a gradation voltage is fixed and an application time of the gradation voltage is adjusted, both a voltage value of a gradation voltage and an application time may be adjusted, thereby performing gradation control.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A driving device of a display medium comprising three kinds of particle groups, each particle group having a different color and having a different movement starting voltage for movement between a pair of substrates according to an electric field, the electric field being formed between the pair of substrates, at least one of which is transparent, wherein the display device includes first and second adjacent pixels for forming an image, the driving device comprising:
    an application unit that applies
        a first voltage with a first pulse width corresponding to a first density of a first color to be displayed to the first pixel,
        the first voltage with a second pulse width corresponding to a second density of the first color to be displayed to the second pixel, wherein the first pulse width is greater than the second pulse width,
        a second voltage with a third pulse width corresponding to a first density of a second color to be displayed to the first pixel, and the second voltage with a fourth pulse width, different from the third pulse width, and corresponding to a second density of the second color to be displayed to the second pixel;

a third voltage with a fifth pulse width corresponding to a first density of a third color to be displayed to the first pixel, and the third voltage with a sixth pulse width corresponding to a second density of the third color to be displayed to the second pixel; and a controller that controls the application unit so that the first voltage finishes being applied to the first and second pixels before the second voltage is applied to the first or the second pixels, and the second voltage finishes being applied to the first and second pixels before the third voltage is applied to the first or the second pixels.

2. The driving device of a display medium according to claim 1, wherein the controller controls the application unit so that the second voltage is applied to the first or second pixel after the first voltage finishes being applied to the first and second pixels and then a predefined period elapses.

3. The driving device of a display medium according to claim 1, wherein each of the pair of substrates includes an electrode.

4. The driving device of a display medium according to claim 1, wherein the first particle group is colored cyan, the second particle group is colored magenta, and the third particle group is colored yellow.

5. The driving device of a display medium according to claim 1, wherein the first particle group is colored red, the second particle group is colored green, and the third particle group is colored blue.

6. A non-transitory computer readable medium storing a driving program of a display medium causing a computer to function as a controller that forms the driving device according to claim 1.

7. A display comprising:

a display medium in which the three kinds of particle groups having different movement starting voltages for movement between a pair of substrates according to an electric field and different colors are enclosed, the electric field being formed between the pair of substrates, at least one of which is transparent; and the driving device of a display medium according to claim 1.

* * * * *